(12) United States Patent
Hom et al.

(10) Patent No.: US 6,331,936 B1
(45) Date of Patent: *Dec. 18, 2001

(54) AC ADAPTER FOR A MODULE BAY IN A COMPUTER SYSTEM

(75) Inventors: Bo Hom; Sean P. O'Neal, both of Round Rock; Rick W. Wahl, Cedar Park, all of TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,364

(22) Filed: Apr. 14, 1999

(51) Int. Cl.$^7$ ............................. G06F 1/16; H05K 7/10
(52) U.S. Cl. ......................................... 361/686; 361/730
(58) Field of Search .................... 361/679, 683, 361/686, 728, 730, 731, 680, 681; 439/928.1

(56) References Cited

U.S. PATENT DOCUMENTS

| | | |
|---|---|---|
| 5,148,095 | 9/1992 | Miller et al. . |
| 5,485,922 * | 1/1996 | Butcher .................................. 206/576 |
| 5,574,625 * | 11/1996 | Ohgami et al. ....................... 361/684 |
| 5,625,535 * | 4/1997 | Hulsebosch et al. ................. 361/719 |
| 5,629,604 | 5/1997 | Sengupta et al. . |
| 5,636,112 | 6/1997 | Faulk . |
| 5,654,740 | 8/1997 | Schulha . |
| 5,666,265 * | 9/1997 | Lutz et al. ............................ 361/683 |
| 5,673,173 * | 9/1997 | Tsai ...................................... 361/686 |
| 5,675,761 * | 10/1997 | Paul et al. ............................ 395/404 |
| 5,734,254 | 3/1998 | Stephens . |
| 5,920,306 * | 7/1999 | Kikinis ................................. 345/158 |

* cited by examiner

Primary Examiner—Lynn D. Feild
(74) Attorney, Agent, or Firm—Haynes and Boone, L.L.P.

(57) ABSTRACT

A portable computer includes a housing including a top portion pivotally mounted on a base portion. The base portion includes a module bay formed therein and also includes an internal module bay connector. A modular AC adapter is removably mounted in the module bay. The adapter is provided with a stationary connector for engagement with the internal module bay connector. A storage compartment is provided in the adapter. A first movable connector assembly includes a connection to the adapter positioned in the storage compartment. A second movable connector assembly is provided for connection to the adapter in the storage compartment. The adapter can be inserted into the module bay and interconnected with the computer. An AC connector can be stored in the adapter for carrying or extended for connection to an AC power source. Alternately, the adapter can be used externally of the computer so that a DC connector of the adapter is engaged with the computer and an AC connector of the adapter is engaged with the AC power source.

6 Claims, 6 Drawing Sheets

AC ADAPTER FOR A MODULE BAY IN A COMPUTER SYSTEM

BACKGROUND

The disclosures herein relate generally to computer systems and more particularly to a module for a portable computer which includes an AC adapter.

When traveling, notebook computer users are required to carry a large combination of extra parts. The list of parts may include a floppy disk drive, a CD-ROM drive, an extra battery, an AC adapter, etc. With today's models, the minimum travel package allows the user to eliminate all of the extra parts but one, the AC adapter. The floppy drive and CD-ROM drives are not real requirements for business trips. An extra battery is useful, but not necessary, especially for notebooks with a long battery life. However, the AC adapter is not a module that can be left behind on a trip of any length. The problem is that for users with a module bay who only wish to carry a main battery and an AC adapter, the module bay is wasted space while the user must find some other luggage space for the AC adapter.

One method that has been used is to build the AC adapter into the notebook. This requires a significant volume of the notebook logic area. The adapter area must be well isolated from the lower power areas. The development of the AC adapter must also closely coincide with the notebook due to the layout restrictions of the notebook instead of being able to leverage from the common AC adapter design.

U.S. Pat. No. 5,148,095 discloses a permanent power pack which replaces the disposable, non-rechargeable, computer clock battery, includes a housing containing a rechargeable battery, and supporting electronic circuit, having an input section, a maintenance section and an output supply section. From the circuit within the housing, an output power connector and electrical leads supply power to the computer's clock, battery powered memory and circuitry. The permanent power pack is supplied electrical energy from the computer supply through a standard disk drive input power connector and electrical leads.

In U.S. Pat. No. 5,629,604, a power supply system for use with a portable personal computer, includes a smart battery pack and a charging system. The smart battery pack is provided with a dedicated microcontroller for controlling the charging level of the battery charger system. The status of the battery, including the voltage and temperature of the battery, is applied to the microcontroller along with a signal representative of the current load demand of the computer system. The microcontroller, in turn, provides a control signal in the form of a fixed frequency, variable duty cycle pulse width modulated (PWM) signal for controlling the charging level of the battery charger system. The duty cycle of the PWM signal is used to regulate the charging current supplied by the battery charger. The DC value of the PWM signal is used as a reference to control the charging current of the regulator to provide a variable output charging current with a relatively wide current range. As such, the battery charger is adapted to efficiently utilize the residual capacity of the battery packs during all operating conditions of the computer system. Moreover, the use of a PWM signal from the battery pack to control the battery charger enables a single type of battery charger to be utilized for various battery technologies.

In U.S. Pat. No. 5,636,112, an internal AC adapter which incorporates a space efficient EMI filter is positioned within a main chassis portion of a portable personal computer having at least one energy-demanding component also positioned within the main chassis portion. The internal AC adapter, which converts alternating current received from an alternating current main to direct current for transmission to the energy-demanding components, includes a first connector for electrically connecting the internal AC adapter to the alternating current main, a bridge rectifier circuit having an AC input side electrically connected to the first connector and a DC output side and a space efficient electromagnetic interference filter having an input side electrically connected to the DC output side of the bridge rectifier circuit and an output side. The bridge rectifier circuit converts alternating current received from the first connector to direct current for transmission to the electromagnetic interference filter. In turn, the electromagnetic interference filter includes at least one capacitative element for filtering noise from the direct current transmitted thereto by the bridge rectifier circuit. The filtered direct current is then transmitted to the energy-demanding components electrically connected to the output side of the electromagnetic interference filter. By placing the electromagnetic interference filter on the DC output side of the bridge rectifier circuit, reduced size capacitors such as a multilayer ceramic capacitor may be used as the capacitative element.

U.S. Pat. No. 5,654,740 discloses a pointing device for a portable computer that is integrated into the same package as its power supply which may also be used as an auxiliary power supply for the portable computer. As a result of its use, a portable computer would be able to alternatively draw energy from an alternating current power source, its own direct current power source, or the direct current power source located in the housing.

U.S. Pat. No. 5,734,254 discloses a battery pack, adapter and integrated charging system for charging a battery pack of the type used in a portable electronic device such as a notebook computer, a cellular telephone, etc. The battery pack includes a battery coupled through the power converter to a secondary transformer winding. A communication link is provided to the adapter which includes control logic and a power selector. The adapter may be configured to provide DC or AC power to charge a portable electronic device and the processor of a portable electronic device may be used to control charging of an external battery pack.

In U.S. Pat. No. 5,818,705, an internal AC adapter which incorporates a space efficient EMI filter is positioned within a main chassis portion of a portable personal computer having at least one energy-demanding component also positioned within the main chassis portion. The internal AC adapter, which converts alternating current received from an alternating current main to direct current for transmission to the energy-demanding components, includes a first connector for electrically connecting the internal AC adapter to the alternating current main, a bridge rectifier circuit having an AC input side electrically connected to the first connector and a DC output side and a space efficient electromagnetic interference filter having an input side electrically connected to the DC output side of the bridge rectifier circuit and an output side. The bridge rectifier circuit converts alternating current received from the first connector to direct current for transmission to the electromagnetic interference filter. In turn, the electromagnetic interference filter includes at least one capacitative element for filtering noise from the direct current transmitted thereto by the bridge rectifier circuit. The filtered direct current is then transmitted to the energy-demanding components electrically connected to the output side of the electromagnetic interference filter. By placing the electromagnetic interference filter on the DC output side of the bridge rectifier circuit, reduced size capacitors such as a multilayer ceramic capacitor may be used as the capacitative element Therefore, in view of the limitations of past developments, what is needed is a module for a notebook computer that includes an AC adapter, such that the module is removably mounted into the options module bay of the notebook computer.

SUMMARY

One embodiment, accordingly, includes an AC adapter which is insertable into the options module bay of a portable computer and is connectable to the computer within the options bay or externally thereof. To this end, a modular AC adapter includes a housing and a stationary connector mounted on the housing. A storage compartment is provided in the housing. A first movable connector assembly includes a connection to the adapter which is positioned in the storage compartment. In addition, a second movable connector assembly provides a connection to the adapter which is in the storage compartment.

A principle advantage of this embodiment is that a main battery and an AC adapter can each be stored in a module bay of a portable computer for travel or at any convenient time.

BRIEF DESCRIPTION OF THE DRAWING FIGURES

DETAILED DESCRIPTION

Figure 1:
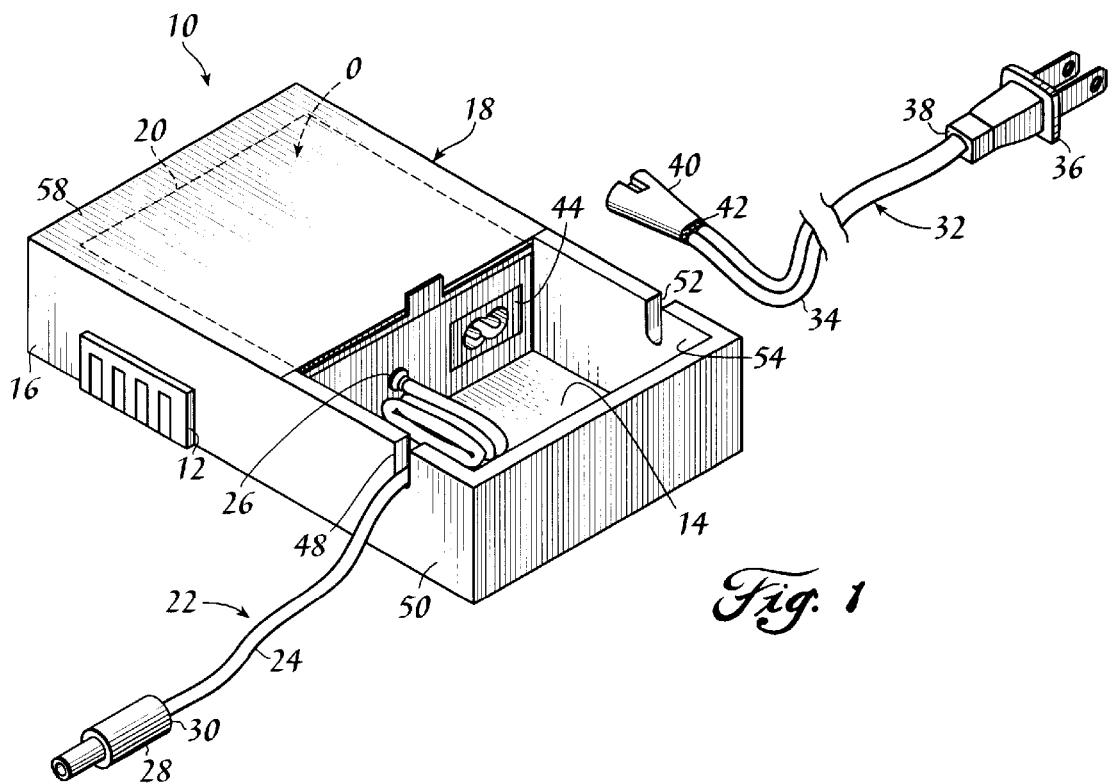
FIG. 1 is an isometric view illustrating an embodiment of an AC adapter.

In one embodiment, a modular AC adapter is generally designated 10 in FIG. 1. Adapter 10 includes a housing 18 having a stationary connector 12 mounted thereon. A storage compartment 14 is formed in the adapter 10 and is adjacent an electronic portion 16 of housing 18. Storage compartment 14 includes a door 20 which is slidably movable between a closed position "C", discussed below, and an open position "O" as illustrated in phantom outline. A first movable connector assembly 22 is provided and includes a cord 24 having an end 26 fixedly connected to electronic portion 16 of housing 18. Cord 24 also includes a DC connector 28 at an end 30 thereof, opposite end 26. Adapter 10 also includes a second movable connector assembly 32 including a cord 34 having an AC connector 36 at an end 38 thereof. Cord 34 also has a connector 40 at an end 42 thereof, opposite end 38. Connector 40 is provided for removably attaching cord 34 to adapter 10 by means of a connector 44 mounted in a wall portion 46 of the storage compartment 14 adjacent the electronic portion 16 of adapter 10. A first slot 48 is provided in a sidewall 50 of storage compartment 14 to permit cord 24 to exit the adapter 10 when door 20 is in the closed position "C", discussed below. Also, a second slot 52 is provided in a sidewall 54 of storage compartment 14 to permit cord 34 to exit adapter 10 when door 20 is in the closed position "C", discussed below. Storage compartment 14 may be of a size sufficient to store cords 24 and 34 therein.

Figure 2:
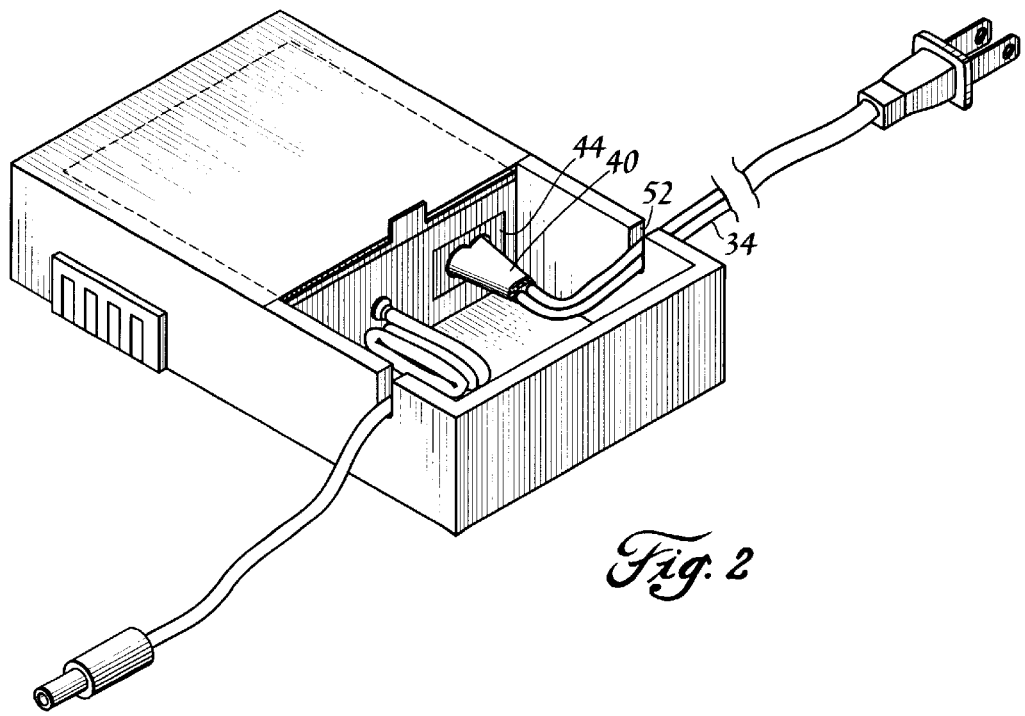
FIG. 2 is another isometric view illustrating an embodiment of an AC adapter.
Figure 3:
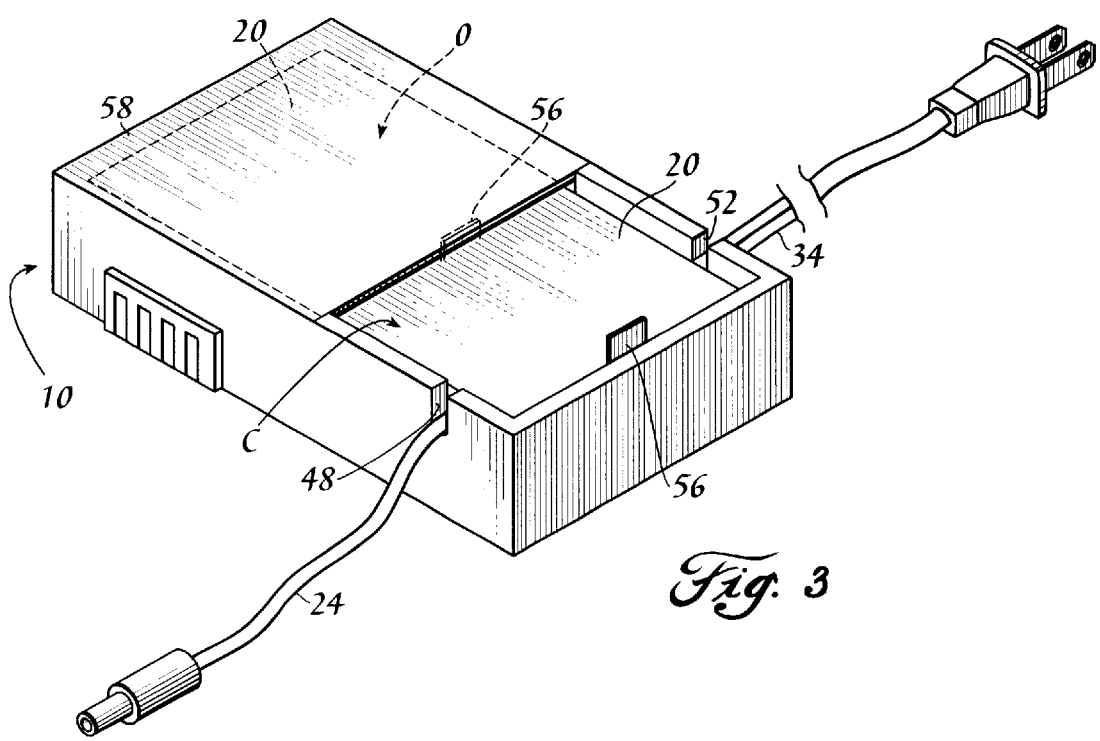
FIG. 3 is a further isometric view illustrating an embodiment of an AC adapter.

FIG. 2 illustrates cord 34 in slot 52 and connector 40, in engagement with connector 44. In FIG. 3, door 20 is illustrated in the closed position "C" and cord 24 exits adapter 10 via slot 48 whereas cord 34 exits adapter 10 via slot 52. Door 20 is movable to closed position "C", or returned to open position "O", by manual movement of a pull tab 56 connected to door 20. When door 20 is in closed position "C", storage compartment 14 is concealed. When door 20 is in open position "O", FIGS. 1 and 2, storage compartment 14 is exposed. Door 20 opens by sliding under an adjacent surface or wall 58 of housing 18, FIGS. 1 and 3.

Figure 4:
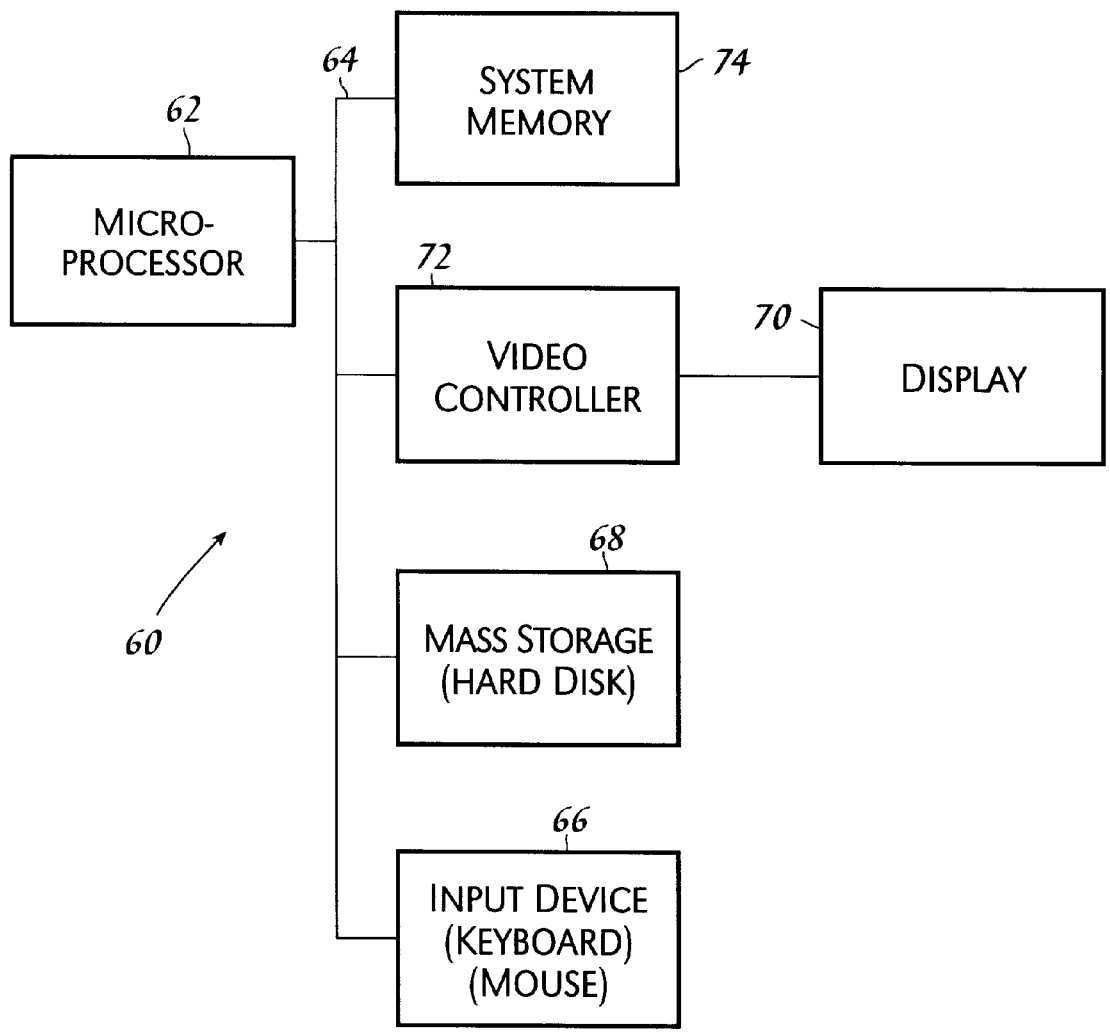
FIG. 4 is a diagrammatic view illustrating an embodiment of a computer system.

A computer system 60, FIG. 4, includes a microprocessor 62 which is connected to a bus 64. Bus 64 services as a connection between microprocessor 62 and other components of computer system 60. An input device 66 is coupled to microprocessor 62 to provide input to microprocessor 62. Examples of input devices include keyboards, touchscreens, and pointing devices such as mouses, trackballs and trackpads. Programs and data are stored on a mass storage device 68 which is coupled to microprocessor 62. Mass storage devices include such devices as hard disks, optical disks, magneto-optical drives, floppy drives and the like. Computer system 60 further includes a display 70 which is coupled to microprocessor 62 by a video controller 72. A system memory 74 is coupled to microprocessor 62 to provide the microprocessor 62 with fast storage to facilitate execution of computer programs by microprocessor 62. It should be understood that other busses and intermediate circuits can be deployed between the components described above and microprocessor 62 to facilitate interconnection between the components and the microprocessor.

Figure 5:
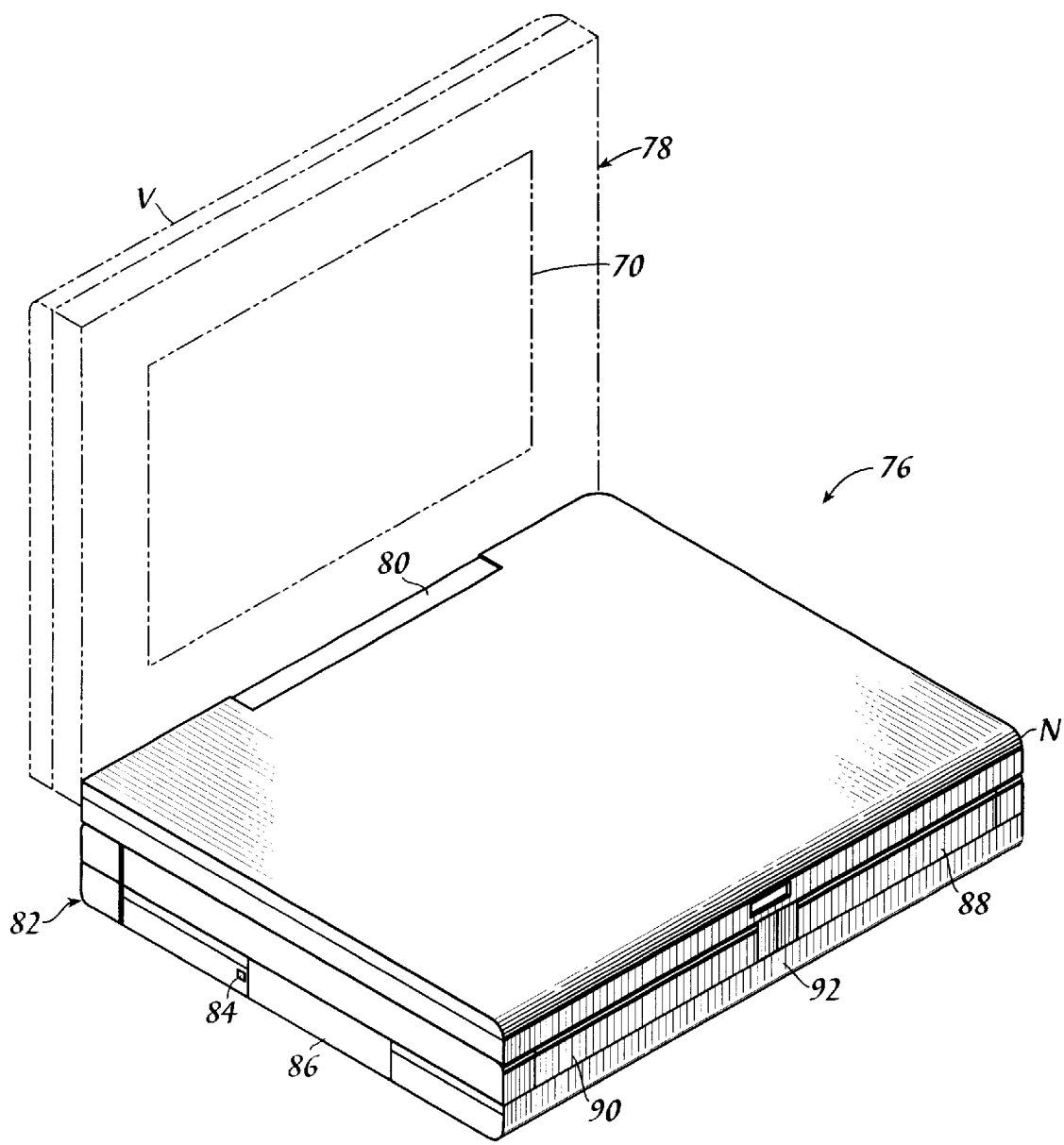
FIG. 5 is an isometric view illustrating an embodiment of a portable computer.

Referring to FIG. 5, illustrated is a portable, notebook size computer designated 76 including a self-contained computer system such as that illustrated at 60 in FIG. 4, and including a hinged top or lid 78, having the display 70, rotatable about a pivotable member 80 from a nested position "N", with a horizontal base 82, to a substantially vertical or open position "V" shown in FIG. 5. A DC input connector 84 is provided in a sidewall 86 of base 82. A battery bay 88 and a module bay 90 are provided in a front wall 92 of base 82.

Figure 6:
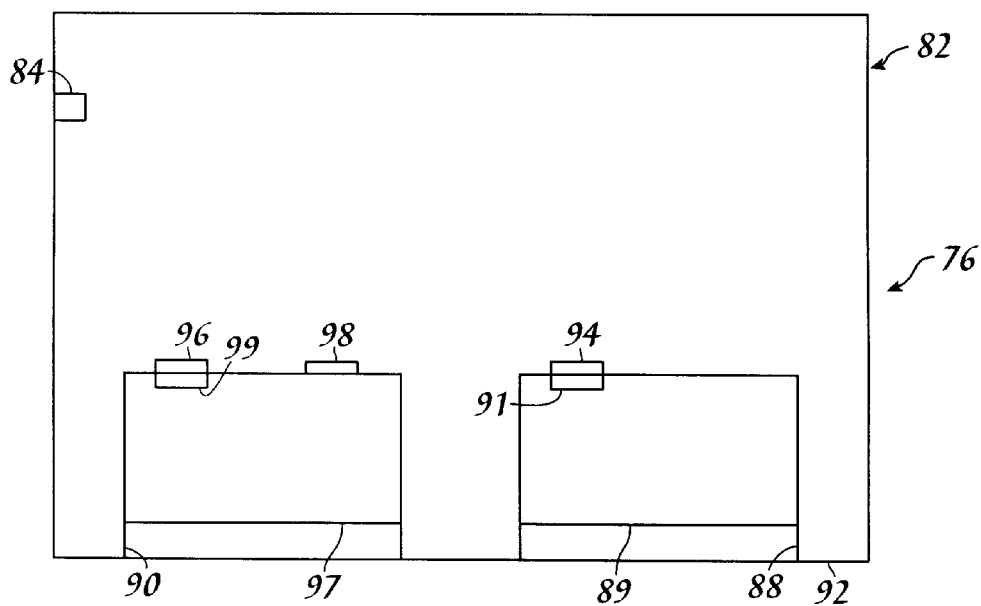
FIG. 6 is a diagrammatic view illustrating an embodiment of a portable computer.
Figure 7:
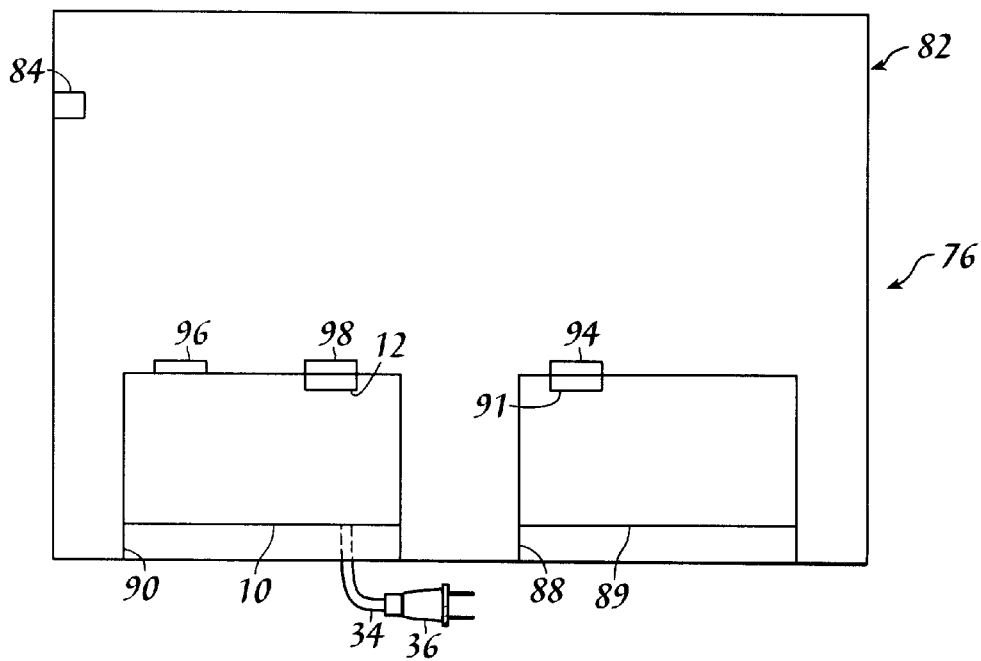
FIG. 7 is another diagrammatic view illustrating an embodiment of a portable computer.
Figure 8:
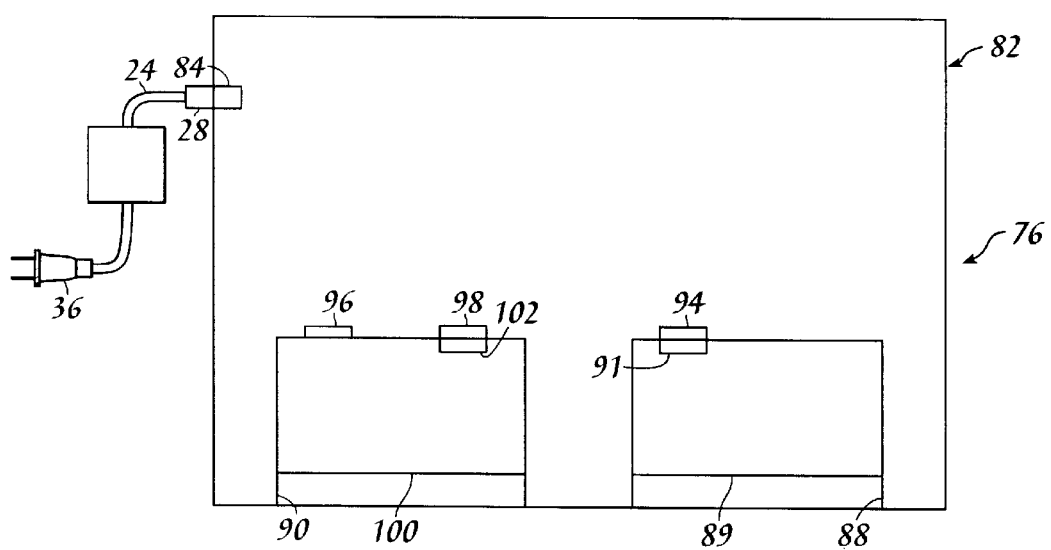
FIG. 8 is a further diagrammatic view illustrating an embodiment of a portable computer.

FIG. 6 illustrates portable computer 76 including the battery bay 88, module bay 90 and DC connector 84. Battery bay 88 includes a stationary connector 94 mounted therein for connection with a battery 89 and battery connector 91 inserted into battery bay 88. Module bay 90 includes a stationary connector 96 mounted therein for also making connection with a battery 97 and battery connector 99. In addition, module bay 90 includes another stationary connector 98 for connection with connector 12 of adapter 10, FIGS. 1 and 7, or for connection with another module such as a CD ROM module 100, FIG. 8, having a connector 102. In this manner, adapter 10 can be inserted into module bay 90, FIG. 7, and interconnected with computer 76. AC connector 36 may be stored in adapter 10 for carrying or may be extended via cord 34 from adapter 10 and connected to an AC power source (not shown) when computer 76 is in use. Alternatively, adapter 10 may be used externally of computer 76, FIG. 8, such that DC connector 28 of cord 24 is engaged with DC connector 84 of base 82. AC connector 36 can then be engaged with an AC power source (not shown) when computer 76 is in use. This configuration permits a CD ROM module 100 or the like, to be inserted into module bay 90 for use with computer 76.

As a result, one embodiment provides a modular AC adapter including a housing, a stationary connector mounted on the housing and a storage compartment in the housing. A first movable connector assembly includes a connection to the adapter positioned in the storage compartment. Also, a second movable connector assembly is provided for connection to the adapter positioned in the storage compartment.

Another embodiment provides a housing including a top portion pivotally mounted on a base portion. The base portion includes a module bay formed therein having an internal module bay connector. A modular AC adapter is removably mounted in the module bay. The adapter is provided with a stationary connector for engagement with the internal module bay connector. A storage compartment is provided in the adapter. A first and a second movable connector assembly each include a connection to the adapter in the storage compartment.

Another embodiment provides a computer system including a chassis, a microprocessor mounted in the chassis, an input coupled to provide input into the microprocessor, a mass storage coupled to the microprocessor, a display coupled to the microprocessor by a video controller, and a memory coupled to provide storage to facilitate execution of computer programs by the microprocessor. A housing is removably mounted in a module bay formed in the chassis. A stationary connector is mounted on the housing for engagement with a connector mounted in the module bay. A storage compartment is provided in the housing, and a first and a second movable connector assembly each include a connection to the adapter in the storage compartment.

A further embodiment provides a method of storing an AC adapter in a portable computer including forming a module bay in the portable computer and mounting an internal connector in the module bay. The adapter is removably mounted in the module bay so that a stationary connector on the adapter engages an internal connector in the module bay. A storage compartment is formed in the adapter, for storing a first movable connector assembly which includes a connection to the adapter, and for storing a second movable connector assembly for connection to the adapter.

Another embodiment provides a portable computer including a housing having a top portion pivotally mounted on a base portion. The base portion has a battery bay and a module bay. The module bay includes an internal module bay connector. An AC adapter is removably mounted in the module bay. The adapter is provided with a stationary connector for engagement with the internal module bay connector. A storage compartment is provided in the adapter. A first movable connector assembly includes a connection to the adapter positioned in the storage compartment. A second movable connector assembly is provided for connection to the adapter in the storage compartment.

As it can be seen, the principal advantages of these embodiment are that a main battery and an AC adapter can each be stored in a module bay of a portable notebook computer. A connector is placed on the module in the same location as the battery connector so that the AC adapter can power the notebook directly while installed. If the AC adapter module is to be used while outside of the system (as is usually done with another module installed), the standard cable would be permanently attached to the module. The battery circuits on the notebook can be designed to permit one battery bay connector to charge the second battery. There is a cable capture system on the module. Most module bays have more room than is required by an AC adapter, so there is enough room for the adapter cable system. There is also enough room to store the AC cord from the adapter to the wall for a completely self-contained system. The minimum travel weight and hassle are decreased for the weight conscious user.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer comprising:
   a housing including a top portion pivotally mounted on a base portion, the base portion including an external DC connector, a module bay formed in the base portion, and an internal DC module bay connector;
   a modular AC adapter removably mounted in the module bay, the adapter being provided with a stationary connector for engagement with the internal DC module bay connector;
   a storage compartment in the adapter;
   a first movable DC connector assembly including a cord storable in the storage compartment and a fixed connection to the adapter positioned in the storage compartment; and
   a second movable AC connector assembly including a cord storable in the storage compartment and a movable connection to the adapter in the storage compartment, whereby the adapter is connectable externally of the base portion by connecting the movable DC connector assembly to the external DC connector, and the adapter is connectable internally of the base portion by inserting the adapter in the module bay and connecting the stationary connector with the internal DC module bay connector.

2. The portable computer as defined in claim 1 wherein the housing includes a door movable between an open position and a closed position, for opening and closing the storage compartment.

3. A computer system comprising:
   a chassis having an external DC connector and a module bay including an internal DC connector;
   a microprocessor mounted in the chassis;
   an input coupled to provide input into the microprocessor;
   a mass storage coupled to the microprocessor;
   a video controller coupled to the microprocessor;
   a memory coupled to provide storage to facilitate execution of computer programs by the microprocessor;
   a modular AC adapter removably mounted in a module bay formed in the chassis;
   a stationary connector mounted on the housing for engagement with the internal DC connector mounted in the module bay;
   a storage compartment in the housing;
   an adapter adjacent the storage compartment;
   a first movable DC connector assembly including a cord storable in the storage compartment and a fixed connection to the adapter positioned in the storage compartment; and
   a second movable AC connector assembly including a cord storable in the storage compartment and a movable connection to the adapter in the storage compartment, whereby the adapter is connectable externally of the base portion by connecting the movable DC connector assembly to the external DC connector, and the adapter is connectable internally of the base portion by inserting the adapter in the module bay and connecting the stationary connector with the internal DC module bay connector.

4. The computer system as defined in claim 3 wherein the housing includes a door movable between an open position and a closed position, for opening and closing the storage compartment.

5. A portable computer comprising:

a housing including a top portion pivotally mounted on a base portion, the base portion including an external DC connector, a battery bay and a module bay formed in the base portion, the module bay having an internal DC module bay connector;

a modular AC adapter removably mounted in the module bay, the adapter being provided with a stationary connector for engagement with the internal DC module bay connector;

a storage compartment in the adapter;

a first movable DC connector assembly including a cord storable in the storage compartment and a fixed connection to the adapter positioned in the storage compartment; and a second removable AC connector assembly including a cord storable in the storage compartment and a movable connection to the adapter in the storage compartment, whereby the adapter is connectable externally of the base portion by connecting the movable DC connector assembly to the external DC connector, and the adapter is connectable internally of the base portion by inserting the adapter in the module bay and connecting the stationary connector with the internal DC module bay connector.

6. The portable computer as defined in claim 5 wherein the housing includes a door movable between an open position and a closed position, for opening and closing the storage compartment.

* * * * *